(12) United States Patent
Philippe et al.

(10) Patent No.: US 12,172,339 B2
(45) Date of Patent: Dec. 24, 2024

(54) TOOL AND METHOD FOR MANUFACTURING A COMPOSITE-MATERIAL PART BY MEANS OF A LIQUID PROCESS

(71) Applicant: SAFRAN CERAMICS, Le Haillan (FR)

(72) Inventors: Eric Philippe, Moissy-Cramayel (FR); Medhy Damien Bounia, Moissy-Cramayel (FR); Aurélia Clerambourg, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 607 days.

(21) Appl. No.: 17/414,765

(22) PCT Filed: Dec. 19, 2019

(86) PCT No.: PCT/FR2019/053205
§ 371 (c)(1),
(2) Date: Jun. 16, 2021

(87) PCT Pub. No.: WO2020/128364
PCT Pub. Date: Jun. 25, 2020

(65) Prior Publication Data
US 2022/0016801 A1    Jan. 20, 2022

(30) Foreign Application Priority Data
Dec. 21, 2018    (FR) ....................... 1874009

(51) Int. Cl.
*B28B 1/24*    (2006.01)
*B28B 1/52*    (2006.01)
(Continued)

(52) U.S. Cl.
CPC .................. *B28B 1/24* (2013.01); *B28B 1/52* (2013.01); *B28B 7/0008* (2013.01); *B28B 7/40* (2013.01)

(58) Field of Classification Search
CPC ............................... B28B 7/0008; B28B 1/24
See application file for complete search history.

(56) References Cited

U.S. PATENT DOCUMENTS

| | | | |
|---|---|---|---|
| 2006/0125155 A1* | 6/2006 | Sekido | B29C 70/547 264/511 |
| 2017/0369382 A1 | 12/2017 | Billotte Cabre et al. | |
| 2019/0134848 A1 | 5/2019 | Podgorski et al. | |

FOREIGN PATENT DOCUMENTS

| | | |
|---|---|---|
| CH | 526 376 A | 8/1972 |
| DE | 198 41 047 C1 | 1/2000 |

(Continued)

OTHER PUBLICATIONS

International Search Report as issued in International Patent Application No. PCT/FR2019/053205, dated Apr. 17, 2020.

*Primary Examiner* — Christopher T Schatz
(74) *Attorney, Agent, or Firm* — Pillsbury Winthrop Shaw Pittman LLP (57) ABSTRACT

A tool for manufacturing a ceramic matrix composite part by injecting a slurry, the tool includes an injection chamber intended to receive at least one fibrous preform to be densified, wherein the injection chamber includes first injection ports which are formed in a first side of the injection chamber for injecting the slurry into the injection chamber, the first injection ports being distributed along the first side of the injection chamber; the injection chamber includes first drainage ports which are formed on the first side of the injection chamber for draining a liquid phase of the slurry from the injection chamber, the first drainage ports being distributed along the first side of the injection chamber; and (Continued)

the tool includes a first filtration element which is located on the first side of the injection chamber and which is located opposite the first drainage ports.

14 Claims, 7 Drawing Sheets

(51) Int. Cl.
*B28B 7/00* (2006.01)
*B28B 7/40* (2006.01)

(56) References Cited

FOREIGN PATENT DOCUMENTS

FR 3 030 505 A1 6/2016
FR 3 050 454 A1 10/2017

* cited by examiner

TOOL AND METHOD FOR MANUFACTURING A COMPOSITE-MATERIAL PART BY MEANS OF A LIQUID PROCESS

CROSS-REFERENCE TO RELATED APPLICATIONS

This application is the U.S. National Stage of PCT/FR2019/053205, filed Dec. 19, 2019, which in turn claims priority to French patent application number 1874009 filed Dec. 21, 2018. The content of these applications are incorporated herein by reference in their entireties.

TECHNICAL FIELD

The present invention relates to the general field of the manufacture of parts made of composite material, in particular ceramic matrix composite (CMC) material, i.e., comprising a fibrous reinforcement formed from fibers of ceramic material densified by a matrix also made of ceramic material, such as an oxide/oxide type, for example.

PRIOR ART

Ceramic matrix composite (CMC) parts are typically made by draping a plurality of fibrous strata made from fibers of ceramic material, such as carbide or oxide, into a mold to form a fibrous preform.

The preform is then impregnated with a slurry filled with particles of ceramic material, such as carbide or oxide, by a process known as resin transfer molding (RTM). In the particular case of the production of a part made of oxide/oxide CMC material, the fibers and particles of the slurry are made of oxide, such as alumina ($Al_2O_3$), for example.

Document US20173,69382 describes a known tool in which a fibrous preform is disposed in a housing formed inside said tool so as to give the desired shape to said fibrous preform. The tool comprises a slurry injection port disposed opposite a first side of the fibrous preform, and a slurry discharge port which is located opposite a second side of said fibrous preform. The fibrous preform is arranged on a filter, said filter being located between the discharge port and the second side of the preform in order to retain the ceramic particles of the slurry inside the fibrous preform.

However, the tool described in document US2017369382 has the problem of not allowing densification in the case where one side of the fibrous preform is inaccessible, such as when the fibrous preform has a side that is covered by an acoustic insulation layer.

Document US2019134848 is also known, which describes a tool. However, the tool described in US20,191,34848 does not allow densification in the case where one side of the fibrous preform is inaccessible.

The problem arises in particular for large parts, parts with a length of at least the order of one meter, for which the densification of the preform, one side of which is inaccessible, is difficult.

DISCLOSURE OF THE INVENTION

The main purpose of the present invention is therefore to overcome such disadvantages by proposing a tool for densifying a large fibrous preform, one side of which is inaccessible, for example because one side of the texture is covered by an acoustic insulation layer.

According to a first aspect, the invention proposes a tool for manufacturing a ceramic matrix composite part by injecting a slurry, said tool comprising an injection chamber intended to receive at least one fibrous preform to be densified, characterized in that:

- the injection chamber comprises a plurality of first injection ports which are formed in a first side of said injection chamber for injecting the slurry into the injection chamber, said first injection ports being distributed along the first side of the injection chamber;
- the injection chamber comprises a plurality of first drainage ports which are formed on the first side of said injection chamber for draining a liquid phase of the slurry from the injection chamber, said first drainage ports being distributed along the first side of the wedge cavity; and
- the tool comprises a first filtration element which is located on the first side of said injection chamber and which is located opposite the first drainage ports.

The fact that the first injection ports and the first drainage ports are located on the same side of the injection chamber makes it possible to densify the fibrous preform by injecting and draining the slurry through the same side of said fibrous preform. This thus makes it possible to densify the fibrous preform even if one side of said fibrous preform is inaccessible because, for example, it is covered by an acoustic insulation layer.

Injecting the slurry through a plurality of injection ports distributed along the first surface of the injection chamber and draining the liquid phase of the slurry through a plurality of drainage ports distributed along said first surface improves the densification of the fibrous preform by stacking the ceramic particles. This is particularly advantageous for large fibrous preforms for which homogeneous densification when the slurry is injected and drained through the same side of the fibrous preform is more difficult to achieve.

The tool may comprise the following additional features, taken alone or in combination according to the technical possibilities:

- between 2% and 30% of the surface area of the first side of the injection chamber is pierced by the first injection ports and the first drainage ports;
- at least one first injection port is located between two first drainage ports;
- the injection chamber comprises a first end and a second end opposite the first end, a first drainage port being located at the first end of the injection chamber and a first drainage port being located at the second end of the injection chamber;
- a plurality of second injection ports is located on a second side of the injection chamber which is opposite to the first side of said injection chamber, a plurality of second drainage ports is located on said second side of said injection chamber, and a second filtration element is located on said second side of the injection chamber opposite the second drainage ports;
- the tool comprises a rigid and fixed mold forming a second side of the injection chamber opposite the first side of said injection chamber, and wherein the tool comprises a rigid and movable counter-mold which forms the first side of the injection chamber;
- the tool comprises a rigid and fixed mold forming a second side of the injection chamber opposite the first side of said injection chamber, and wherein the tool comprises a flexible membrane which forms the first side of the injection chamber;

a draining felt is arranged between the filtration element and the first drainage ports.

According to a second aspect, the invention proposes a process for manufacturing a ceramic matrix composite part comprising the following steps:

placing a first fibrous preform in an injection chamber formed in a tool according to any one of the preceding features;

injecting a slurry comprising ceramic particles suspended in a liquid phase into the first fibrous preform through a first side of said first fibrous preform through a plurality of first injection ports;

draining the liquid phase of the slurry through a plurality of first drainage ports from the first side of the first fibrous preform through a filtration element configured to retain the ceramic particle powder in the first fibrous preform.

The process may comprise the following additional features, taken alone or in combination according to the technical possibilities:

the process further comprises the following steps:
placing the first fibrous preform and a second fibrous preform in the injection chamber, the first fibrous preform and the second fibrous preform being located on either side of a central core;
injecting through a plurality of second injection ports the slurry into the second fibrous preform through a first side of said second fibrous preform;
draining the liquid phase of the slurry through a plurality of second drainage ports from the first side of the second fibrous preform through a second filtration element configured to retain the ceramic particles in the second fibrous preform.

the first fibrous preform is fixed on a porous support, the process comprising a step of sealing the support with the slurry before the step of injecting the slurry into the first fibrous preform by injecting a fugitive material into the porosities of said support, the process further comprising a step of removing the fugitive material after the liquid phase of the slurry has drained;

the first fibrous preform has a thickness of 10 mm or less;

at least one among the first fibrous preform and the second fibrous preform has a thickness of 10 mm or less.

BRIEF DESCRIPTION OF THE DRAWINGS

Further features and advantages of the present invention will emerge from the description below, with reference to the appended drawings which illustrate an example embodiment devoid of any limiting nature.

DESCRIPTION OF THE EMBODIMENTS

Figure 1A:
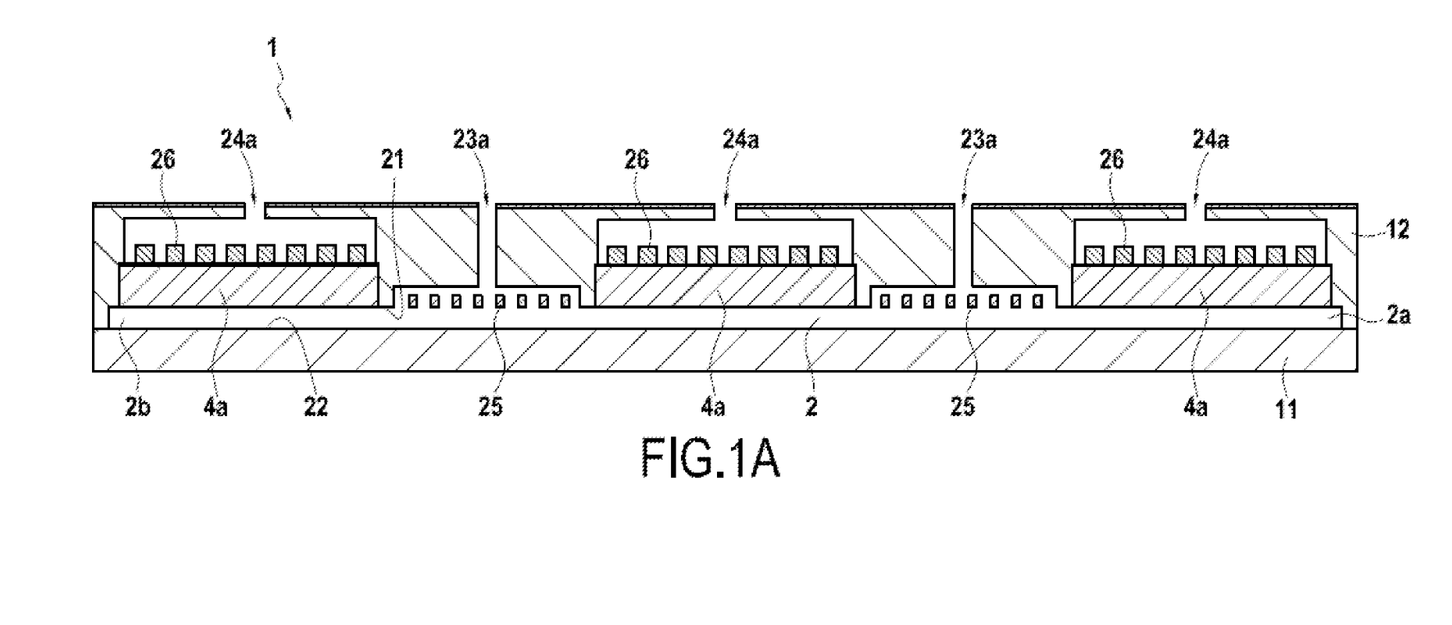
FIG. 1a is a schematic view of a tool for manufacturing a ceramic material part according to a first possible alternative.
Figure 1B:
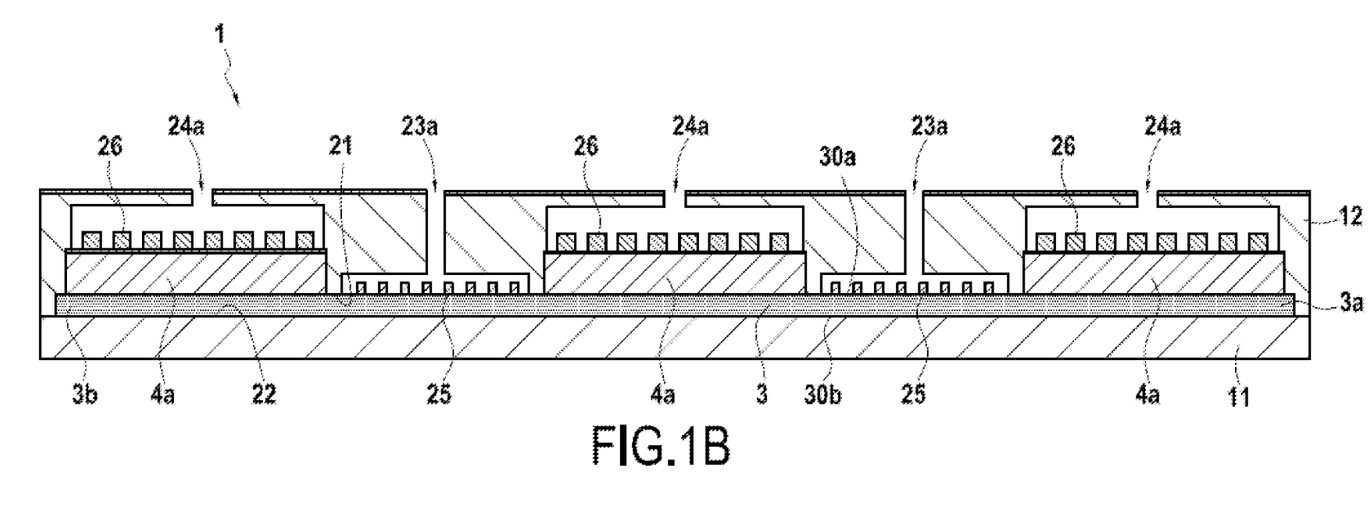
FIG. 1b shows the tool of FIG. 1a within which a fibrous preform is installed.

As illustrated in FIGS. 1a and 1b, the tool 1 for manufacturing a ceramic matrix composite part comprises an injection chamber 2 in which a fibrous preform 3 is installed.

FIG. 1a illustrates the tool 1 without the fibrous preform 3, thus making the injection chamber 2 visible, while FIG. 1b illustrates the tool 1 with the fibrous preform 3 installed in the injection chamber 2.

Once the fibrous preform 3 is installed in the injection chamber 2, the fibrous preform 3 is densified by injection of a slurry. The slurry is formed by a liquid phase loaded with ceramic particles, the ceramic particles being intended to be deposited in the fibrous preform 3 in order to densify it and form the ceramic matrix.

The liquid phase of the slurry can in particular be formed by water (acidic or basic pH), ethanol, or any other liquid in which it is possible to suspend the desired powder. An organic binder can also be added (PVA, PEG, PVP, soluble in water). This binder ensures that the raw material will hold after drying and before sintering.

The ceramic particles of the slurry may be alumina, mullite, silica, zirconia, aluminosilicate or aluminophosphate, or a mixture of these components. The ceramic particles may also be carbide, such as silicon carbide. The average particle size is between 0.1 µm and 10 µm. "Average size" refers to the size given by the statistical particle size distribution at half the population, known as D50.

In the first alternative embodiment illustrated in FIGS. 1a and 1b, the injection chamber 2 is formed by the cooperation between a rigid mold 11 and an equally rigid counter-mold 12. The counter-mold 12 defines a first side 21 of the injection chamber 2, and the mold 11 defines a second side 22 of said injection chamber 2, the second side 22 being opposite the first side 21.

The fibrous preform 3 to be densified is placed in an impression formed on the mold 11, then the counter-mold 12 is placed opposite the mold 11 and compresses the fibrous preform 3 in order, on the one hand, to give it the desired shape and, on the other hand, to ensure that the part to be manufactured has a desired fiber volume rate. The fibrous preform 3 comprises a first side 30a directed towards the counter-mold 12, and a second side 30b opposite the first side 30a and which is directed towards the mold 11.

In order to inject the slurry inside the injection chamber 2, said injection chamber 2 comprises a plurality of first injection ports 23a that are formed in the first side 21 of said injection chamber 2. The first injection ports 23a are distributed along the first side 21.

In addition, in order to allow for the evacuation of the slurry from the injection chamber 2, said injection chamber 2 comprises a plurality of first drainage ports 24a that are formed in the first side 21. The first drainage ports 24a are distributed along the first side 21.

In addition, in order to retain the ceramic particles of the slurry inside the injection chamber 2 and the fibrous preform 3, the tool 1 comprises a first filtration element 4a which is located opposite the drainage ports 24, said first filtration element 4a being located on the first side 21 of the injection chamber 2.

The first filtration element 4a is configured to allow the liquid phase of the slurry to pass through but retain the ceramic particles. To this end, the first filtration element 4a may be a porous element whose pore size is adapted to the size of the ceramic particles of the slurry so that said ceramic particles of the slurry do not pass through said first filtration element 4a and thus are retained in the injection chamber.

In the alternative shown in FIGS. 1a and 1b, the first injection ports 23a and the first drainage ports 24a are formed in the counter-mold 12, but according to another possible alternative the first injection ports 23a and the first drainage ports 24a are formed in the mold 11 (and are thus formed in the second side 22), and the first filtration element 4a is located opposite the first drainage ports 24 on the mold 11.

The fact that the first injection ports 23a and the first drainage ports 24a are formed and distributed along a same side of the injection chamber 2 makes it possible to inject and drain through a same side of the fibrous preform 3, thus making it possible to densify the fibrous preform 3 even when a side of said fibrous preform 3 is inaccessible.

In addition, the fact that the tool 1 comprises a plurality of first injection ports 23a and a plurality of first drainage ports 24a allows a more homogeneous densification of the fibrous preform 3.

Indeed, the fact of injecting and draining the slurry through the same side of the preform 3 tends to create a concentration of ceramic particles at the level of the first injection ports 23a. The multiplicity of the first injection ports 23a and the first drainage ports 24a makes it possible to limit the concentration of particles at the first injection ports 23a.

These features are particularly advantageous when the fibrous preform 3 is large, because homogeneous densification of a large fibrous preform 3 by injection and drainage of the slurry through the same side of said fibrous preform 3 is more difficult to achieve than when the injection of the slurry is carried out through a first side of the fibrous preform 3 and when the drainage of the slurry is carried out through a second side of said fibrous preform opposite to the first side. The fibrous preform may comprise a surface area of between 200×200 mm and a few m².

According to an advantageous feature for improving the homogeneity of the deposition of ceramic particles in the fibrous preform 3, at least one first injection port 23a is located between two first drainage ports 24a. Preferably, each first injection port 23a is located between two first drainage ports 24a.

Furthermore, advantageously, the diameter of the first injection ports 23a and the first drainage ports 24a is adapted so that said first injection ports 23a and said first drainage ports 24a represent between 2% and 30% of the surface area of the first side 21 of the injection chamber 2. In other words, the piercing area of the first injection ports 23a, plus the piercing area of the drainage ports 24a, corresponds to between 2% and 30% of the surface area of the first side 21 of the injection chamber 2. Advantageously, between 10% and 20% of the surface area of the first side 21 can be pierced by the first injection ports 23a and the first drainage ports 24a. This feature improves the homogeneity of the deposition of the ceramic particles inside the fibrous preform 3. The surface area of the first side 21 of the injection chamber is very close to the surface area of the fibrous preform 3.

As seen in FIGS. 1a and 1b, advantageously, the injection chamber 2 comprises a first end 2a and a second end 2b that is opposite the first end 2a, with a first drainage port 24a located at the first end 2a and another first drainage port 24a located at the second end 2b.

Thus, when the fibrous preform 3 is located in the injection chamber 2, the first drainage port 24a located at the first end 2a of the injection chamber 2 is located opposite a first end 3a of said fibrous preform 3, while the first drainage port 24a located at the second end 2b of the injection chamber 2 is located opposite a second end 3b of said fibrous preform 3 that is opposite the first end 3a.

The fact that first drainage ports 24a are located at the ends of the injection chamber 2 makes it possible to position first drainage ports 24 at the ends of the fibrous preform 3, and thus makes it possible to ensure better circulation of the slurry at the ends of the fibrous preform 3, thus improving the homogeneity of the densification of said fibrous preform 3.

As seen in FIGS. 1a and 1b, a mesh 25 can be arranged in the first injection ports 23a in order to prevent the threads of the fibrous preform 3 from forming a bulge at the first injection ports 23, on the one hand, and to improve the distribution of the slurry, on the other.

A mesh 26 may also be disposed in the first drainage ports 24a, over the first filtration element 4a. Thus, the first filtration element 4a is located between the fibrous preform 3 and the mesh 26. The mesh 26 located in the first drainage ports 24a ensures that the filtration element 4 is held in the first drainage ports 24a.

According to a possible feature, the thickness of the fibrous preform 3 is 10 mm or less. Such a thickness of the fibrous preform 3 is suitable for injection and drainage of the slurry from the same side, allowing for improved deposition of ceramic particles within said fibrous preform 3, and in particular at the side of the fibrous preform 3 that is opposite the first side 21 of the injection chamber 2.

Figure 2:
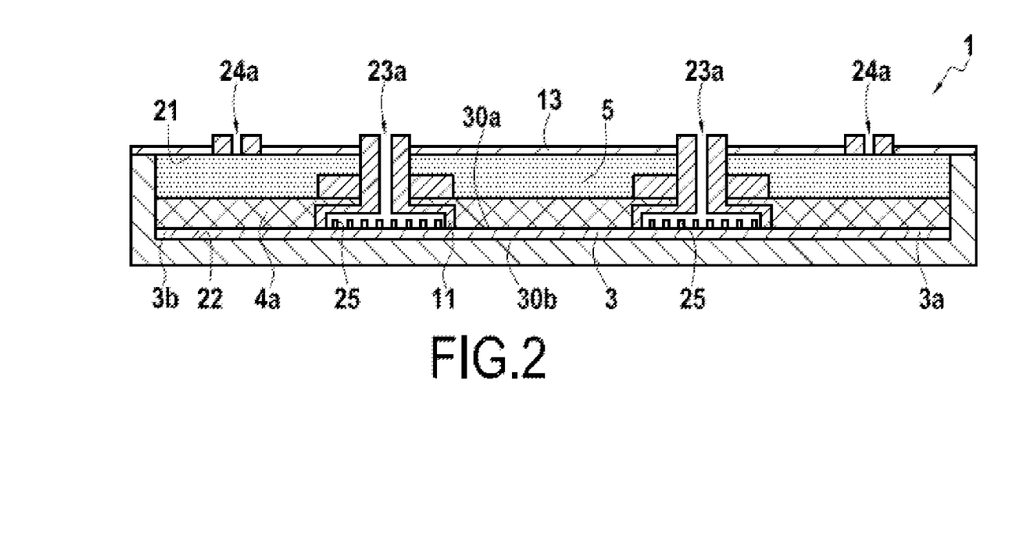
FIG. 2 is a schematic view of a tool for manufacturing a ceramic material part according to a second possible alternative.

According to a second alternative shown in FIG. 2, the compaction of the fibrous preform 3 can be achieved by cooperation of the mold 11 with a flexible membrane 13, instead of cooperation of the mold 11 with a counter-mold 12 as achieved in the first alternative of FIGS. 1a and 1b.

In this second alternative, the fibrous preform 3 is installed in the injection chamber 2 which is formed by the flexible membrane 13 and the mold 11, the flexible membrane 13 forming the first side 21 of the injection chamber 2 and the mold 11 forming the second side 22 of said injection chamber 2. The first side 30a of the fibrous preform is directed toward the flexible membrane 13, and the second side 30b is directed toward the mold 11.

Once the fibrous preform 3 is disposed in the injection chamber 2, the fibrous preform 3 is compacted by the flexible membrane 13 so that the part to be manufactured has the desired fiber volume ratio, and said fibrous preform 3 is densified by injecting the slurry into the injection chamber 2 via the plurality of first injection ports 23a formed in the first side 21 of the injection chamber 2. The slurry is drained through the first drainage ports 24a.

The arrangement of the first injection ports 23a and the first drainage ports 24a of the tool 1 according to the second alternative shown in FIG. 2 may be similar to the first alternative shown in FIGS. 1a and 1b. In FIG. 2, the first injection ports 23a are not arranged between two first drainage ports 24a, however the first injection ports 23a may be arranged between two first drainage ports 24a.

In addition, similarly to the first alternative, the tool 1 according to the second alternative shown in FIG. 2 comprises a first filtration element 4a that is located opposite the first drainage ports 24a in order to retain the ceramic particles inside the fibrous preform 3. The first filtration element 4a is located between the fibrous preform 3 and the first side 21 of the injection chamber 2.

As illustrated in FIG. 2, the tool 1 may include a draining felt 5 that is disposed between the flexible membrane 13 and the first filtration element 4a. The draining felt helps to facilitate the flow of fluid to the drainage ports 24a.

In a similar manner to the first alternative, the tool 1 according to the second alternative may comprise a mesh 25 arranged in the first injection ports 23a in order to prevent the threads of the fibrous preform 3 from forming a bulge at the first injection ports 23a, on the one hand, and to improve the distribution of the slurry, on the other.

In the alternatives illustrated in FIGS. 1a, 1b and 2, the fibrous preform 3 alone is installed in the injection chamber 2. However, the fibrous preform 3 can be installed in the injection chamber 2 while being fixed on a support, said support being able to be, for example, an acoustic insulation layer, or a structural layer. However, when the support is a central core and the part to be manufactured comprises two fibrous preforms arranged on either side of the central core, the alternatives illustrated in FIGS. 1a, 1b and 2 are not suitable for simultaneously densifying the two fibrous preforms.

Figure 3:
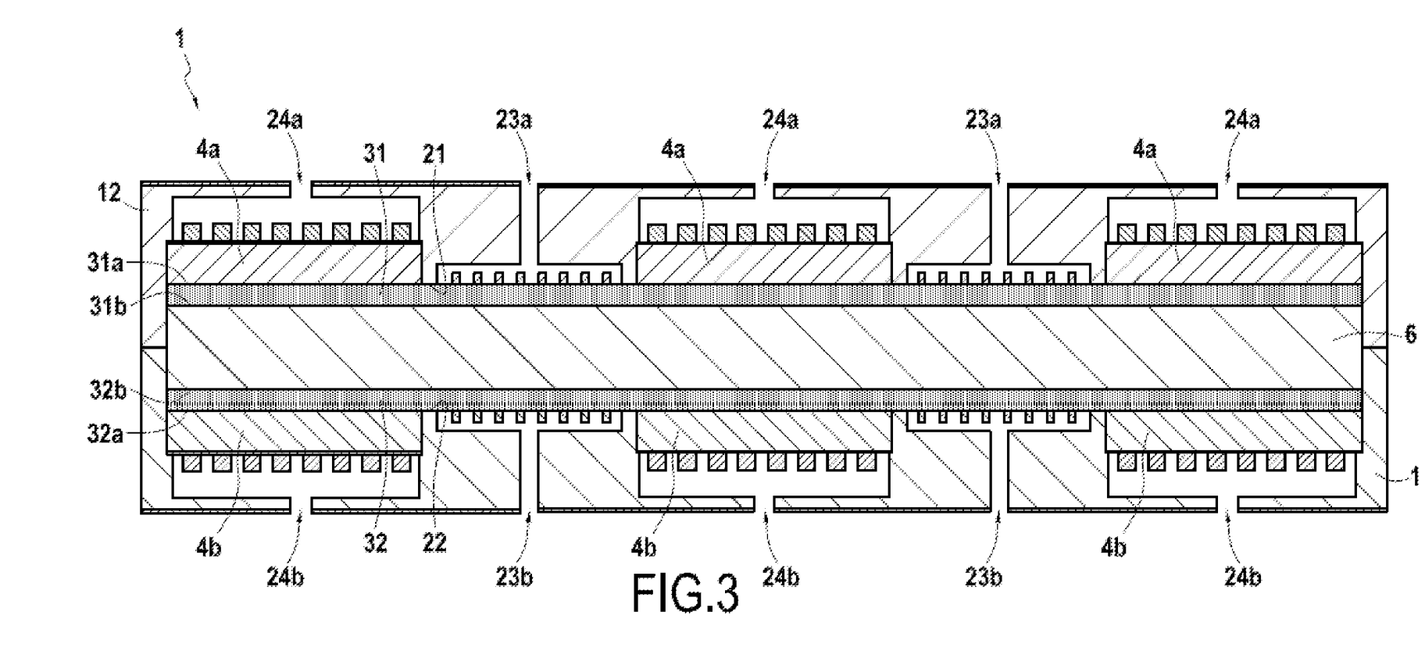
FIG. 3 is a schematic view of a tool for manufacturing a ceramic material part according to a third possible alternative.
Figure 4:
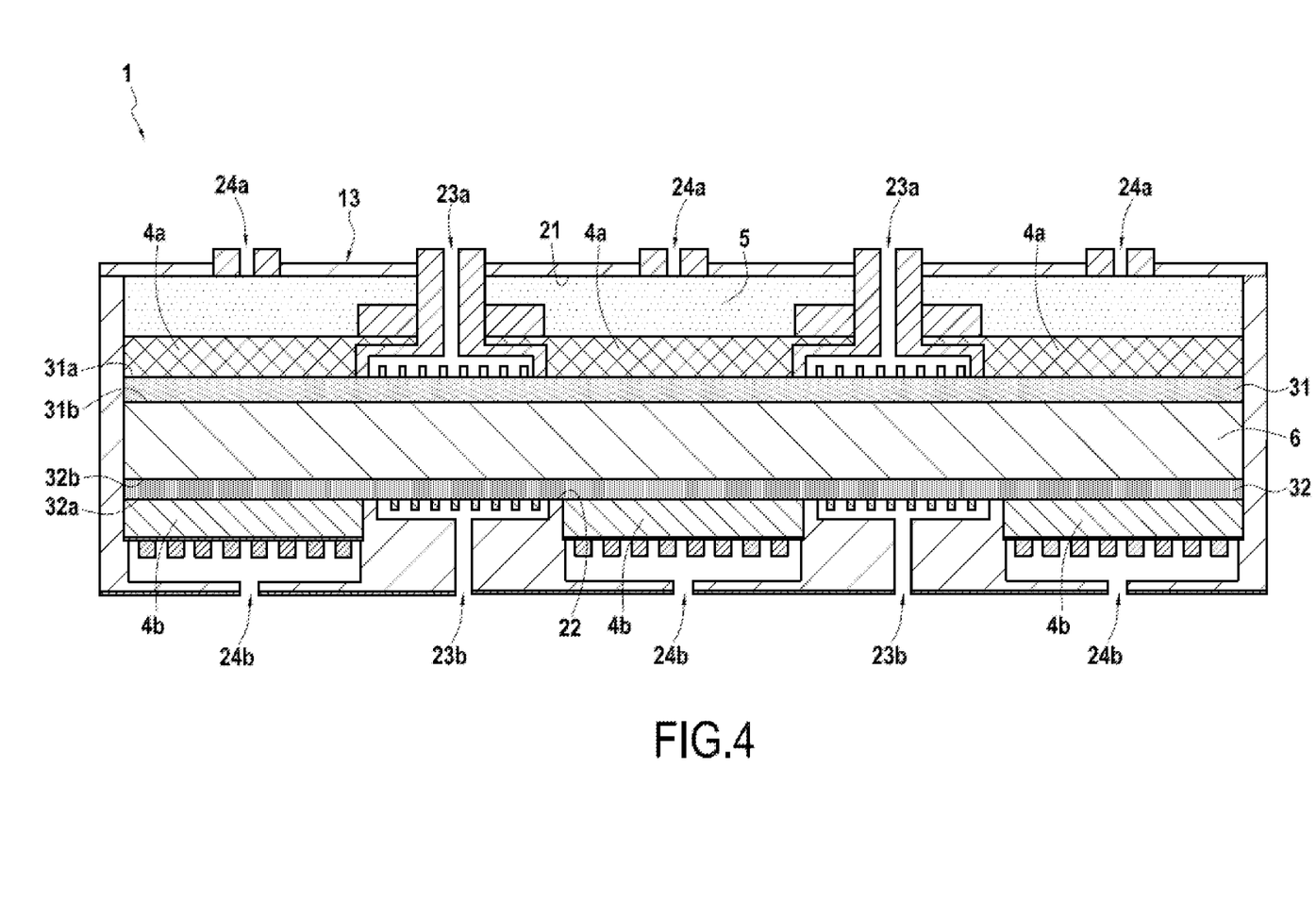
FIG. 4 is a schematic view of a tool for manufacturing a ceramic material part according to a fourth possible alternative.

FIG. 3 and FIG. 4 illustrate respectively a third alternative and a fourth alternative embodiment of tool 1 making it possible to densify in a single time a part which comprises a first fibrous preform 31 and a second fibrous preform 32 which are located on both sides of a central core 6. Advantageously, at least one of the fibrous preform 31 and the second fibrous preform 32 has a thickness of 10 mm or less, advantageously the fibrous preform 31 and the second fibrous preform 32 both have a thickness of 10 mm or less. The first fibrous preform 31 comprises a first side 31a which is directed towards the first side 21 of the injection chamber 2, and a second side 31b opposite the first side 31a and which is fixed to the central core 6. The second fibrous preform 32 comprises a first side 32a which is directed opposite the second side 22 of the injection chamber 2, and a second side 32b opposite the first side 32a and which is fixed to the central core 6.

The central core 6 can, for example, be an acoustic insulation layer, or a structural layer whose function is to improve the mechanical strength of the part to be manufactured. The central core 6 can in particular be a honeycomb structure.

In the third alternative and the fourth alternative of FIGS. 3 and 4, in addition to having a plurality of first injection ports 23a and a plurality of first drainage ports 24a on the first side 21 of the injection chamber 2, the tool 1 comprises a plurality of second injection ports 23b and a plurality of second drainage ports 24b on the second side 22 of the injection chamber 2.

In the third alternative shown in FIG. 3, similarly to the first alternative shown in FIGS. 1a and 1b, the injection chamber 2 is formed by the cooperation of the mold 11 and the counter-mold 12. The counter-mold 12 forms the first side 21 of the injection chamber 2 while the mold 11 forms the second side 22 of said injection chamber 2.

The distribution of the first injection ports 23a and the first drainage ports 24a on the counter-mold 12 in the third alternative is similar to the distribution of the first injection ports 23a and the first drainage ports 24a on the counter-mold 12 in the first alternative. Furthermore, in the third alternative shown in FIG. 3, the distribution of the second injection ports 23b and the second drainage ports 24b on the mold 11 may be similar to the distribution of the first injection ports 23a and the first drainage ports 24a on the counter-mold 12.

In the fourth alternative shown in FIG. 4, similar to the second alternative shown in FIG. 2, the injection chamber 2 is formed by the cooperation of the mold 11 and the flexible membrane 13. The flexible membrane 13 forms the first side 21 of the injection chamber 2 while the mold 11 forms the second side 22 of said injection chamber 2.

The distribution of the first injection ports 23a and the first drainage ports 24a on the flexible membrane 13 in the fourth alternative is similar to the distribution of the first injection ports 23a and the first drainage ports 24a on the flexible membrane 13 in the second alternative. Furthermore, in the fourth alternative shown in FIG. 3, the distribution of the second injection ports 23b and the second drainage ports 24b on the mold 11 is similar to the distribution of the first injection ports 23a and the first drainage ports 24a on the mold 11 in the third alternative.

As visible in FIGS. 3 and 4, the tool 1 of the third alternative and the fourth alternative comprises a second filtration element 4b that is located opposite the second drainage ports 24b formed in the second side 22 of the injection chamber 2. Furthermore, in a manner similar to the first and second alternatives, the tool 1 comprises the first filtration element 4a which is located opposite the first drainage ports 24a formed in the first side 21 of the injection chamber 2.

Thus, the tool 1 of the third alternative and the fourth alternative of FIGS. 3 and 4 allows for simultaneous densification of the first fibrous preform 31 and the second fibrous preform 32 by injecting and draining the slurry through a same side of said first fibrous preform 31 and second fibrous preform 32.

Figure 5:
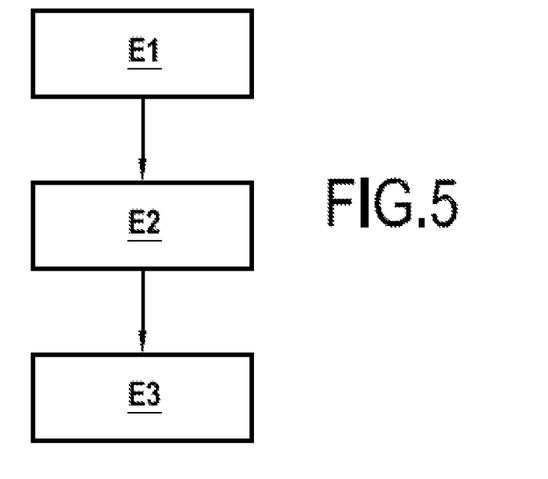
FIG. 5 is a schematic view of a manufacturing process according to an implementation of the invention.

As illustrated in FIG. 5, according to one possible implementation of the invention, a process for manufacturing a ceramic matrix composite part comprises the following steps:

S1: placing a first fibrous preform in the injection chamber 2 formed in the tool 1 according to any one of the alternatives illustrated in FIGS. 1 to 4. The fibrous preform may be a fibrous preform alone, or it may be a fibrous preform located on a support, the support being for example a central core and the fibrous preform being located on one side of said central core S2: injecting the slurry into the first fibrous preform through a first side of said first fibrous preform through the plurality of first injection ports 23a;

S3: draining the liquid phase of the slurry through the plurality of first drainage ports 24a from the first side of the first fibrous preform through the first filtration element 4a to retain the ceramic particles in the first fibrous preform.

Once the fibrous preform is densified, said fibrous preform is dried, then demolded and the ceramic particles can be sintered. In addition, in the case of a carbide/carbide composite part, molten metal such as silicon can be injected into the pores of the ceramic matrix composite material.

Figure 6:
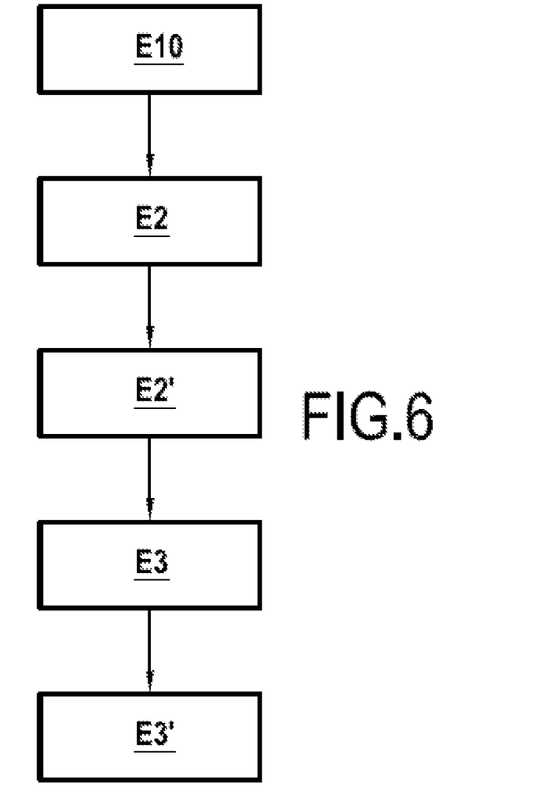
FIG. 6 is a schematic view of a manufacturing process using the tool of FIG. 3 or FIG. 4.

As illustrated in FIG. 6, when a first fibrous preform 31 and a second fibrous preform 32 are located on opposite sides of a central core 6, as in the third and fourth alternatives illustrated in FIGS. 3 and 4, respectively, the process may comprise the following steps:

S10: placing the first fibrous preform 31 and the second fibrous preform 32 in the injection chamber 2;

S2: injecting the slurry into the first fibrous preform 31 through the first side 31a of said first fibrous preform 31 through the plurality of first injection ports 23a;

S2': injecting through a plurality of second injection ports 23b the slurry into the second fibrous preform 32 through the first side 32a of said second fibrous preform 32;

S3: drainage through the plurality of first drainage ports 24a of the liquid phase of the slurry from the first side 31a of the first fibrous preform 31 through the first filtration element 4a to retain the ceramic particle powder in the first fibrous preform 31;

S3': draining the liquid phase of the slurry through the plurality of second drainage ports 24b from the first side 32a of the second fibrous preform 32 through the second filtration element 4b to retain the ceramic particle powder in the second fibrous preform 32.

The injection steps S2 and S2' can advantageously be performed simultaneously, and the drainage steps S3 and S3' can also advantageously be performed simultaneously.

Once the first and second fibrous preforms 31 and 32 are densified, the first and second fibrous preforms 31 and 32 are dried and then demolded and the ceramic particles can be sintered. In the case of a carbide/carbide composite part, molten metal such as silicon can be injected into the porosities of the ceramic matrix composite material.

Figure 7:
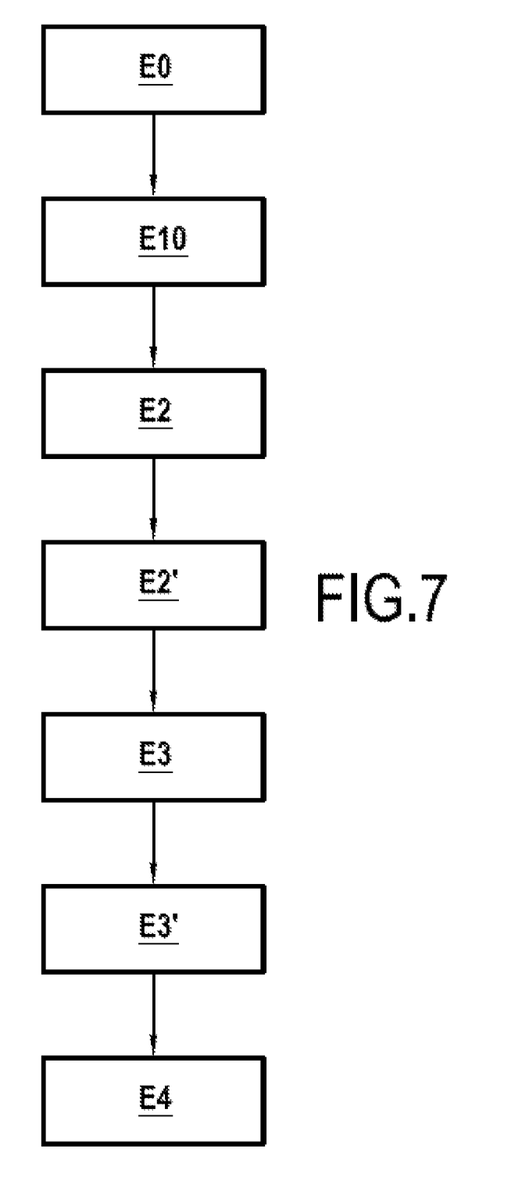
FIG. 7 is a schematic view of a possible alternative of the manufacturing process.

As illustrated in FIG. 7, when the fibrous preform(s) are fixed on a porous support, for example when a first fibrous preform 31 and a second fibrous preform 32 are located on either side of a porous central core 6, the process may include a step of sealing S0 the support with slurry prior to the step of injecting S2 and/or S2' the slurry into the fibrous texture(s). The step of sealing S0 the support is carried out by injecting a fugitive material, for example polymethylmethacrylate (PMMA) into the pores of said support. Thus, when the support is honeycombed, the fugitive material is injected into the honeycomb cells. The process also comprises a step of removing S4 the fugitive material after the step of draining S3 and/or S3' the liquid phase. The fugitive material can for example be removed by melting and then casting, or by thermal decomposition (pyrolysis).

The invention claimed is:

1. A tool for manufacturing a ceramic matrix composite part by injecting a slurry, said tool comprising an injection chamber adapted to receive at least one fibrous preform to be densified, wherein:
    the injection chamber comprises a plurality of first injection ports which are formed in a first side of said injection chamber for injecting the slurry into the injection chamber, said first injection ports being distributed along the first side of the injection chamber;
    the injection chamber comprises a plurality of first drainage ports which are formed on the first side of said injection chamber for draining a liquid phase of the slurry from the injection chamber, said first drainage ports being distributed along the first side of the injection chamber;
    the tool comprises a first filtration element which is located on the first side of said injection chamber and which is located opposite the first drainage ports; and
    a mesh is arranged in the first injection ports, and
    an interior lateral wall of each first injection port surrounds the mesh.

2. The tool as claimed in claim 1, wherein between 2% and 30% of a surface area of the first side of the injection chamber is pierced by the first injection ports and the first drainage ports.

3. The tool as claimed in claim 1, wherein at least one first injection port of the plurality of first injection ports is located between two first drainage ports.

4. The tool as claimed in claim 1, wherein the injection chamber comprises a first end and a second end opposite the first end, a first drainage port of the plurality of first drainage ports being located at the first end of the injection chamber and another first drainage port of the plurality of first drainage ports being located at the second end of the injection chamber.

5. The tool as claimed in claim 1, wherein a plurality of second injection ports is located on a second side of the injection chamber which is opposite to the first side of said injection chamber, wherein a plurality of second drainage ports is located on said second side of said injection chamber, and wherein a second filtration element is located on said second side of the injection chamber opposite the second drainage ports.

6. The tool as claimed in claim 1, wherein said tool comprises a rigid and fixed mold forming a second side of the injection chamber opposite the first side of said injection chamber, and wherein the tool comprises a rigid and movable counter-mold which forms the first side of the injection chamber.

7. The tool as claimed in claim 1, wherein said tool comprises a rigid and fixed mold forming a second side of the injection chamber opposite the first side of said injection chamber, and wherein the tool comprises a flexible membrane which forms the first side of the injection chamber.

8. The tool as claimed in claim 7, wherein a draining felt is arranged between the first filtration element and the first drainage ports.

9. A process for manufacturing a ceramic matrix composite part, the process comprising: placing a first fibrous preform in an injection chamber formed in a tool for manufacturing the ceramic matrix composite part by injecting a slurry, said tool comprising the injection chamber adapted to receive at least one fibrous preform to be densified, wherein: the injection chamber comprises a plurality of first injection ports which are formed in a first side of said injection chamber for injecting the slurry into the injection chamber, said first injection ports being distributed along the first side of the injection chamber; the injection chamber comprises a plurality of first drainage ports which are formed on the first side of said injection chamber for draining a liquid phase of the slurry from the injection chamber, said first drainage ports being distributed along the first side of the injection chamber; the tool comprises a first filtration element which is located on the first side of said injection chamber and which is located opposite the first drainage ports; and a mesh is arranged in the first injection ports, an interior lateral wall of each first injection port surrounds the mesh; injecting the slurry comprising ceramic particles suspended in the liquid phase into the first fibrous preform through a first side of said first fibrous preform through the plurality of first injection ports; draining the liquid phase of the slurry through the plurality of first drainage ports from the first side of the first fibrous preform through the first filtration element configured to retain the ceramic particles in the first fibrous preform.

10. The process as claimed in claim 9, further comprising:
    placing the first fibrous preform and a second fibrous preform in the injection chamber, the first fibrous preform and the second fibrous preform being located on either side of a central core;
    injecting through a plurality of second injection ports the slurry into the second fibrous preform through a first side of said second fibrous preform;
    draining the liquid phase of the slurry through a plurality of second drainage ports from the first side of the second fibrous preform through a second filtration element configured to retain the ceramic particles in the second fibrous preform.

11. The process as claimed in claim 9, wherein the first fibrous preform is fixed on a porous support, the process comprising a step of sealing the support with the slurry before the step of injecting the slurry into the first fibrous preform by injecting a fugitive material into the porosities of said support, the process further comprising a step of removing the fugitive material after the liquid phase of the slurry has drained.

12. The process as claimed in claim 9, wherein the first fibrous preform has a thickness of 10 mm or less.

13. The process as claimed in claim 10, wherein at least one among the first fibrous preform and the second fibrous preform has a thickness of 10 mm or less.

14. The tool as claimed in claim 1, wherein the first filtration element is located on the first side of said injection chamber without extending in front of the first injection ports to allow the liquid phase of the slurry to pass through the first filtration element but retain ceramic particles of the slurry within the at least one fibrous preform.

\* \* \* \* \*